US008758598B2

(12) United States Patent
Hansen et al.

(10) Patent No.: US 8,758,598 B2
(45) Date of Patent: Jun. 24, 2014

(54) CATALYST COMPRISING ZEOLITE BETA AND ITS USE IN HYDROCARBON CONVERSION PROCESS

(75) Inventors: Jens A. Hansen, Holte (DK); Niels J. Blom, Hillerod (DK); Birgitte R. Byberg, Birkerød (DK); John W. Ward, Yorba Linda, CA (US)

(73) Assignee: Haldor Topsoe A/S, Lyngby (DE)

( * ) Notice: Subject to any disclaimer, the term of this patent is extended or adjusted under 35 U.S.C. 154(b) by 1673 days.

(21) Appl. No.: 10/518,789

(22) PCT Filed: Jun. 23, 2003

(86) PCT No.: PCT/EP03/06585
§ 371 (c)(1),
(2), (4) Date: Jun. 28, 2005

(87) PCT Pub. No.: WO2004/002623
PCT Pub. Date: Jan. 8, 2004

(65) Prior Publication Data
US 2005/0284795 A1 Dec. 29, 2005

(30) Foreign Application Priority Data
Jun. 28, 2002 (DK) .................. 2002 01017

(51) Int. Cl.
C10G 45/00 (2006.01)
C10G 45/34 (2006.01)
(52) U.S. Cl.
CPC .............. C10G 45/00 (2013.01); C10G 45/34 (2013.01)
USPC ............. 208/110; 208/112; 208/121

(58) Field of Classification Search
CPC .................. C10G 45/00; C10G 45/34
USPC ......... 208/28, 58, 59, 89, 111, 138, 139, 143, 208/111.3, 111.35, 112, 120.3, 120.35, 123, 208/124, 111.01, 110, 121
See application file for complete search history.

(56) References Cited

U.S. PATENT DOCUMENTS

| | | | |
|---|---|---|---|
| 4,486,296 A | 12/1984 | Oleck et al. | |
| 4,601,993 A | 7/1986 | Chu et al. | |
| 4,612,108 A | 9/1986 | Angevine et al. | |
| 4,812,223 A | 3/1989 | Hickey, Jr. et al. | |
| 4,820,402 A * | 4/1989 | Partridge et al. | 208/111.15 |
| 4,894,142 A * | 1/1990 | Steigleder | 208/111.15 |
| 5,011,593 A | 4/1991 | Ware et al. | |
| 5,350,501 A * | 9/1994 | Ward | 208/111.15 |
| 5,800,698 A | 9/1998 | Tejada et al. | |
| 6,103,101 A * | 8/2000 | Fragelli et al. | 208/89 |
| 6,231,750 B1 * | 5/2001 | Kasztelan et al. | 208/111.01 |
| 6,261,441 B1 * | 7/2001 | Gentry et al. | 208/58 |
| 6,809,055 B2 | 10/2004 | Overbeek et al. | |
| 6,844,479 B2 | 1/2005 | Yeh et al. | |
| 2002/0074263 A1 | 6/2002 | Shan et al. | |
| 2004/0045871 A1 * | 3/2004 | Bauer | 208/111.01 |

FOREIGN PATENT DOCUMENTS

| | | |
|---|---|---|
| EP | 94827 A1 * | 11/1983 |
| EP | 1 106 592 | 6/2001 |
| WO | WO 96/13563 | 5/1996 |
| WO | WO 01/17901 | 3/2001 |
| WO | WO 02/32812 | 4/2002 |

* cited by examiner

*Primary Examiner* — Taiwo Oladapo
(74) *Attorney, Agent, or Firm* — Dickstein Shapiro LLP

(57) ABSTRACT

A hydrocarbon conversion catalyst comprising a modified beta zeolite, an amorphous inorganic oxide and a hydrogenation component wherein the said catalyst support has an $NH_3$-AI of less than 3.5 and/or an IEC-AI of less than 3.7.

10 Claims, 1 Drawing Sheet

Selectivity vs. $NH_3$-AI

CATALYST COMPRISING ZEOLITE BETA AND ITS USE IN HYDROCARBON CONVERSION PROCESS

RELATED APPLICATION

This application is a national stage entry of PCT/EP03/06585, filed Jun. 23, 2003 which claims priority from of Danish Patent Application No. PA 2002 01017, filed Jun. 28, 2002, which is incorporated by reference in its entirety.

TECHNICAL FIELD

This invention relates to the refining of petroleum hydrocarbons into products of greater utility and higher value as compared with the feedstock.

Conversion of hydrocarbons into useful products has been practised for many years using catalytic materials. In recent years, the use of catalysts containing zeolite materials has been found in many cases to be superior to the catalysts containing amorphous inorganic oxide materials such as alumina, silica-alumina and the like. Many zeolitic materials have been found to be useful as catalysts, but depending on the specific process, zeolites such as Y, X, omega, ZSM-5, beta and L have been found to be particularly advantageous.

This invention relates in general to catalytic compositions useful for hydrocarbon conversion and in particular to their use in hydrocarbon cracking reactions such as catalytic cracking and hydrocracking. More particularly the invention relates to compositions comprising certain zeolites and metal hydrogenation components and their use in hydrocracking processes. In particular, the invention relates to catalytic compositions comprising beta zeolite and a hydrogenation component and their use in hydrocracking of hydrocarbons. The invention moreover relates to the composition and use of catalytic compositions comprising specifically modified beta zeolites, which give enhanced performance in hydrocarbon conversion reactions especially in the conversion of hydrocarbon feedstocks to middle distillates. Often petroleum refiners produce desirable products, such as gasoline and middle distillates, by catalytically hydrocracking high boiling hydrocarbons into product hydrocarbons of lower average molecular weight and boiling point. Hydrocracking is generally accomplished by contacting in an appropriate reactor vessel a gas oil or other hydrocarbon feedstock with a suitable hydrocracking catalyst under appropriate conditions including an elevated temperature and an elevated pressure and the presence of hydrogen, such that a hydrocarbon product is obtained containing a substantial portion of a desired product boiling in a specified range, as for example a gasoline boiling in the range of 85° C. to 215° C. or middle distillate boiling in the range of 150° C. to 425° C.

Usually, hydrocracking is practised in a single reaction vessel or several in series utilising a single catalyst. In such a scenario, the catalyst not only hydrocracks the hydrocarbon feedstock but simultaneously or sequentially converts the organonitrogen and organosulphur containing compounds into ammonia and hydrogen sulphide. Some isomerisation of normal or near normal paraffins will also take place simultaneously.

Hydrocracking can also be performed in conjunction with hydrotreating usually by a method referred to as "integral operation". In this process, the hydrocarbon feedstock, usually a gas oil containing a substantial proportion of components boiling above a desired end point as for example 215° C. in the case of certain gasolines, is introduced into a catalytic hydrotreating zone wherein in the presence of a suitable catalyst such as a zeolite or sieve-free, particulate catalyst comprising a Group VIII metal component and a Group VIB metal component on a porous, inorganic, refractory oxide catalyst support most often composed of alumina, and under suitable conditions including an: elevated temperature (e.g. 250° C. to 540° C.) and an elevated pressure (e.g. 0.7 to 35 MPa) and with hydrogen as a reactant, the organonitrogen components and the organosulphur components contained in the feedstock are converted to ammonia and hydrogen sulphide, respectively. Subsequently, the entire effluent removed from the hydrotreating zone is treated in a hydrocracking zone maintained under suitable conditions of elevated temperature, pressure and hydrogen partial pressure and containing a suitable hydrocracking catalyst, such that a substantial conversion of high boiling feed components to products components boiling below the desired end point is obtained. Usually, the hydrotreating and hydrocracking zones in integral operation are maintained in separate reactor vessels, but on occasion it may be advantageous to employ a single, downflow reactor vessel containing an upper bed of hydrotreating catalyst particles and lower bed of hydrocracking particles. Examples of integral operation may be found in U.S. Pat. Nos. 3,132,087; 3,159,564; 3,655,551 and 4,040,944, all of which are herein incorporated by reference in their entireties.

When two catalysts in two separate vessels are used, it is often desirable to fractionate (or separate) the products of the first reactor (hydrotreating) so as to remove the produced ammonia, hydrogen sulphide and light gaseous hydrocarbons from the feed to the hydrocracking reactor. Such separation can also be made when two similar catalysts are used.

In some integral operation refining processes, and especially those designed to produce gasoline from the heavier gas oils, a relatively high proportion of the product hydrocarbons obtained from integral operation will have a boiling point above the desired end point. For example, in the production of a gasoline product boiling in the $C_4$ to 215° C. range from a gas oil boiling entirely above 300° C. it may often be the case that as much as 30 to 60 percent by volume of the products obtained from integral operation boil above 215° C. To convert these high boiling components to hydrocarbon components boiling below 215° C., the petroleum refiner separates the 215° C.+ high boiling components from the other products obtained in integral operation usually after first removing ammonia by a water washing operation, a hydrogen-containing recycle gas by high pressure separation, and an $H_2S$-containing $C_1$ to $C_3$ low BTU gas by low pressure separation. This 215° C.+ boiling bottom fraction is then subjected to further hydrocracking either by recycle to the hydrocracking reactor in single stage operation or by introduction into a second hydrocracking zone wherein yet more conversion to the desired $C_4$ to 215° C. product takes place.

In the foregoing two stage process, the two hydrocracking reaction zones often contain hydrocracking catalysts of the same composition. One catalyst suitable for such use is disclosed as Catalyst A in Example 16 of U.S. Pat. Nos. 3,897,327 and 3,929,672, both of which are herein incorporated by reference in their entireties, which catalyst is comprised of a palladium-exchanged, steam-stabilised Y zeolite hydrocracking component. But although the catalysts used in the two hydrocracking reaction zones may have the same composition and the same catalytic properties, the hydrocracking conditions required in the second hydrocracking reaction zone are less severe than those required in the first. The reason for this is that ammonia is not present in the second hydrocracking reaction zone (due to water washing) whereas a significant amount of ammonia is present in the first hydrocracking zone. To account for the difference in operating conditions, it is believed that ammonia neutralizes or otherwise interferes with the acidity of the zeolite in the catalyst of the first reaction zone, thereby forcing the refiner to employ relatively severe conditions for operation as for example increased temperature. On the other hand, in the ammonia-deficient atmosphere of the second hydrocracking reaction zone, high conversions to the desired product are obtainable under relatively moderate conditions often with an operating temperature about 50° C. to 110° C. lower than that required in the first hydrocracking reaction zone.

Further description of two-stage hydrocracking operations may be found in U.S. Pat. Nos. 4,429,053 and 4,857,169 herein incorporated by reference in their entireties, which patents provide process flow sheets for typical two-stage hydrocracking processes.

Although there exist several types of commercial hydrocracking catalysts, which can be used effectively in single stage hydrocracking or either the first, second or both stages of the above-discussed two-stage hydrocracking process, there is always a demand for new catalysts with superior overall activity, selectivity and stability for producing gasoline and/or middle distillate via hydrocracking.

The general object of the present invention is directed to novel catalysts and catalyst supports and novel acid catalysed chemical conversion processes employing such catalysts to promote the desired reactions. The present invention is particularly directed to hydrocarbon conversion catalysts and hydrocarbon conversion processes employing such catalysts comprising a hydrogenation component(s) on a catalyst support comprising zeolite beta modified to a specific acidity.

SUMMARY OF THE INVENTION

The present invention provides a composition for use in the acid catalysed chemical conversion of feedstocks containing organic compounds into reaction-products, particularly in the acid catalysed conversion of hydrocarbons and most especially in hydrocracking. The composition, which may be a catalyst and/or catalyst support, comprises a modified zeolite beta. One or more amorphous, inorganic refractory oxides such as alumina, silica-alumina or other inorganic oxides may also be present in the composition. For hydrocracking purposes, the catalyst requires a hydrogenation component such as one or more Group VIB and/or Group VIII metal components, the hydrogenation components generally being dispersed on the catalyst support material composed of the zeolite beta and amorphous oxides.

The catalysts of the invention are characterised specifically by having a catalyst support with an $NH_3$-AI less than 3.5 and/or an IEC-AI less than 3.7.

DETAILED DESCRIPTION OF THE INVENTION

Figure 1:
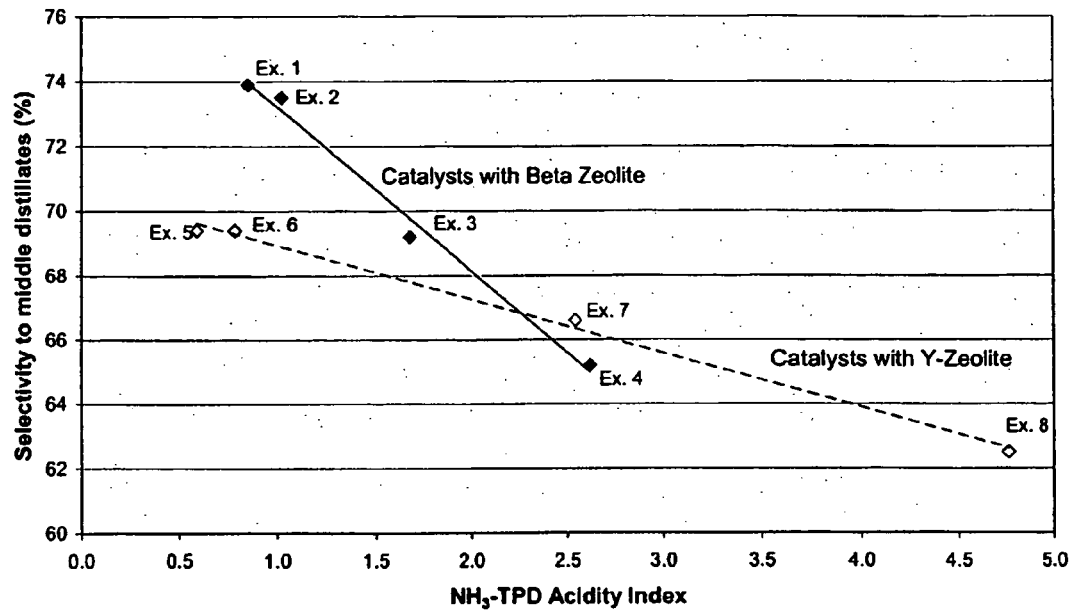
FIGS. 1 and 2 show a comparison of catalysts containing modified zeolite beta catalysts versus catalysts containing zeolite Y.

Zeolite beta is a crystalline zeolite whose composition and X-ray powder diffraction analysis are disclosed in U.S. Pat. No. Reissue 28,341, herein incorporated by reference in its entirety. This zeolite beta is a large pore zeolite having a pore size above 7.0 Angstroms and a Constraint Index below 2, preferably between 0.6 and 1.0. The Constraint Index of a zeolite is a convenient measure of the extent to which a zeolite provides access to molecules of varying sizes to its internal structure. Zeolites, which provide a highly restricted access to and egress from its internal structure have a high value for the Constraint Index, and zeolites of this kind usually have pores of small size. On the other hand, zeolites, which provide relatively free access to the internal zeolite structure, have a low value for the Constraint Index. The method by which Constraint Index is determined is described fully in U.S. Pat. No. 4,016,218, the disclosure of which is herein incorporated by reference in its entirety.

Procedures for measuring the acidity of a zeolite by $NH_3$ TPD and ion exchange capacity have been disclosed in U.S. Pat. No. 4,894,142 to Steigleder and U.S. Pat. No. 4,612,108 to Bezman et al., all of which are herein incorporated by reference in their entireties. Temperature-programmed desorption of ammonia ($NH_3$ TPD) is widely used and is considered to be an effective procedure for determining the acidity strength of zeolites. Ion exchange capacity or IEC is intended to denote the number of active cation sites (acidity) in the zeolite.

Zeolite beta is prepared, in general, as an aluminosilicate zeolite having a $SiO_2$: $Al_2O_3$ molar ratio of at least 10. The zeolite betas have a crystal size of about 0.1 to 5 micron, a surface area of about 400 to 800, a cyclohexane adsorption capacity above 15 g/100 g and a water vapour sorptive capacity at 25° C. and a $p/p_o$ value of 0.10 of greater than 5 weight percent. As used herein "$p/p_o$" represents the water vapour partial pressure to which the zeolite beta is exposed divided by the water vapour partial pressure at 25° C.

Preparation of zeolite beta has been disclosed in U.S. Pat. Reissue No. 28,341. Standard preparation of zeolite beta having a $SiO_2$:$Al_2O_3$ molar ratio of 25-30 have been described in the $2^{nd}$ revised edition of "Verified Syntheses of Zeolitic Materials" by H. Robson (Editor) and K. P. Lillerud (XRD Patterns), Elsevier 2001, which is herein incorporated by reference in its entirety. Zeolite beta can be obtained commercially from companies like Tosoh Corporation, Japan or Zeolyst International, The Netherlands or Süd-Chemie AG, Germany.

As initially prepared, zeolite beta is usually in the alkali metal form and contains an organic templating agent. In this form, the zeolite has low if any catalytic activity for promoting acid catalysed conversion reactions, e.g. cracking reactions. Accordingly, the zeolite is generally converted to more active forms by calcination to decompose and drive off the templating agent followed by base exchange with ammonium cations to substantially reduce the alkali metal content finally followed by another calcination to convert the ammonium-exchanged zeolite to the hydrogen form. For zeolite beta initially prepared in the sodium form, the preferred sodium content upon conversion to an active form is below 1.0 percent by anhydrous weight, preferably below about 0.5 percent by anhydrous weight, calculated as $Na_2O$.

Publications which further discuss the properties of zeolite Beta include U.S. Pat. Nos. 3,923,641; 4,676,887; 4,812,223; 4,486,296; 4,601,993 and 4,612,108, all of which are herein incorporated by reference in their entireties.

In accordance with the invention, it has now surprisingly been found that catalysts containing a metal hydrogenation component and certain modified zeolite beta with a certain ion exchange capacity acidity index and $NH_3$ TPD acidity index are significantly more selective for the production of middle distillate than comparable Y zeolites which for many years have and still form the component of choice in many hydrocracking catalysts.

The use of beta zeolite in hydrocracking catalysts has been reported over several years although there appears to be little if any commercial exploitation.

In U.S. Pat. No. 3,923,641 Morrison reported hydrocracking of $C_5$ naphtha into $C_4$ hydrocarbons using zeolite beta. Gas oil feeds are not contemplated as feedstocks and no attention is given to middle distillate. No mention of dealumination or $SiO_2$:$Al_2O_3$ molar ratio is made. Furthermore, no mention of zeolite $NH_3$ TPD or ion exchange capacity is made.

U.S. Pat. No. 5,128,024 to La Pierre discloses beta zeolite containing catalyst with a $SiO_2$:$Al_2O_3$ molar ratio up to 280:1 for simultaneous hydrocracking and dewaxing. U.S. Pat. No. 5,980,859 to Gajda et al. discloses the modification of beta zeolite by steaming and extraction with ammonium nitrate by ion exchange. The modified zeolite is characterised by IR spectroscopy. No measurements of the $NH_3$ TPD or IEC are reported. The disclosure lists uses for hydrocracking, catalytic cracking, isomerisation, transalkylation and alkylation although only its use for alkylation and transalkylation is illustrated. No relationship of performance and acidity is disclosed and no specific reference to hydrocracking is made. The use is specifically directed to benzene alkylation.

U.S. Pat. No. 5,972,832 to Shi et al. discloses a hydrocracking catalyst containing nickel, tungsten, fluoride, a zeolite and alumina. The carrier contains 10-90% of a zeolite which has an acidic strength value of 1.0-2.0 m mole/g determined by ammonia TPD. Faujasite (Y), mordenite, ZSM-5 and omega zeolite are specified. No acidity strength of beta zeolite is reported. No variation of the zeolite acidity is reported for the same family and no acidity of the catalyst is reported. No dependence of the hydrocracking activity and selectivity on acidity and ion exchange capacity is reported. No illustration of the utilisation of beta zeolite or its comparative performance in hydrocracking is illustrated. Furthermore, no disclosure of ion exchange capacity is given.

U.S. Pat. No. 5,284,573 to La Pierre et al. discloses the use of beta zeolite with a $SiO_2$:$Al_2O_3$ molar ratio of at least 50 and even at least 250. A ratio of 500:1 may be used. A process for hydrotreating and hydrocracking is claimed. However, no disclosure of $NH_3$ TPD or ion exchange capacity is made.

U.S. Pat. No. 4,612,108 to Angevine et al. discloses hydrocracking with beta zeolite directed to middle distillate selectivity. The disclosure illustrates an improvement by using a graded bed in which the concentration of beta zeolite in the catalyst increases with bed depth. Although $SiO_2$:$Al_2O_3$ molar ratio of the beta zeolite greater than 30 is disclosed, no properties of the zeolite containing catalyst are given. No $NH_3$ TPD or ion exchange capacity data are disclosed.

U.S. Pat. No. 4,401,556 to Bezman et al. discloses the use of Y zeolite catalysts for hydrocracking in which the zeolite has a preferred ion exchange capacity (IEC) no greater than 0.07. No impact of IEC on hydrocracking activity is reported, no $NH_3$ TPD is reported and no disclosure of beta zeolite is made.

U.S. Pat. No. 4,894,142 to Steigleder discloses Y zeolites with a $NH_3$ TPD of less than about 2.0 mmole/g, preferably less than 1.5 mmole/g. It states that the selectivity of the modified Y zeolite to produce middle distillate correlates to the acid strength (Col 4 and Col 5). The acid strength is measured by the $NH_3$ TPD value. The patent teaches how to reduce the acid strength by calcination in dry air. TPD $NH_3$ values <2.0 mmole/g and preferably <1.50 mmole/g are taught along with an IEC of >0.07 defined in U.S. Pat. No. 4,401,556. No mention of beta zeolite is made.

U.S. Pat. No. 4,820,402 to Partridge et al. discloses the use of zeolite beta for hydrocracking with $SiO_2$:$Al_2O_3$ molar ratio up to 200 for producing high boiling distillate products. No reference to IEC or $NH_3$ TPD is made. The data illustrate a continuous change in distillate selectivity with the $SiO_2$:$Al_2O_3$ molar ratio for arrange of zeolites such as Y, ZSM-5, beta and ZSM-20. No differentiation between beta and Y with $SiO_2$:$Al_2O_3$ molar ratio is disclosed. In fact a smooth correlation exists for $SiO_2$:$Al_2O_3$ molar ratios from 3 to 300 suggesting that the $SiO_2$:$Al_2O_3$ molar ratio is dominating. Large pore zeolites with $SiO_2$:$Al_2O_3$ molar ratios of 200:1 are said to give good middle distillate selectivities. No reference to IEC or $NH_3$ TPD is made.

DISCLOSURE OF INVENTION

The present invention is specifically directed to catalysts and catalyst support comprising beta zeolites which have been modified so that the $NH_3$ TPD acidity index ($NH_3$-AI) of the catalyst support is less than 3.5 and preferably less than about 2.3. The zeolite beta has also been modified so that the IEC acidity index (IEC-AI) of the catalyst support is less than 3.7, preferably less than about 2.7. The acidity indices $NH_3$-AI and IEC-AI are defined in the section covering the examples.

A synthesised beta zeolite can be modified by any known method or other method which results in a decrease in $NH_3$ TPD and IEC of the original zeolite to one within the scope of the invention. Many such methods for producing modified zeolites have been reported.

Publications, which further discuss the properties of beta zeolite, include U.S. Pat. Nos. 3,923,641; 4,676,887; 4,812,223; 4,486,296; 4,601,993 and 4,612,108. Specific illustrations of beta zeolite modifications can be found in the patent literature. Illustrative treatments of beta zeolite to produce higher $SiO_2$:$Al_2O_3$ molar ratio can be found in for example U.S. Pat. No. 4,820,402 (Partridge et al.) and U.S. Pat. No. 4,430,516 (La Pierre et al.) who teach various treatments illustrated by extraction, hydrothermal treatment and ion exchange. Other methods involving direct synthesis have been described in e.g. U.S. Pat. No. 5,554,356 to Saxton et al., U.S. Pat. No. 5,164,170 to Rubin. U.S. Pat. No. 4,923,690 to Valyocsik describes a method of synthesising beta zeolite which directly produce higher $SiO_2$:$Al_2O_3$ molar ratio than those originally disclosed in U.S. Pat. No. 3,308,069 (Wadinger). All of these patent disclosures are incorporated by reference in their entireties.

Although the modified beta zeolite is the key component of this invention, the catalyst or catalyst support will generally comprise the modified zeolite intimately mixed with an acidic amorphous component and optimally a binder. The amorphous inorganic oxide can be chosen from the well known acidic oxides such as alumina, silica, titania, magnesia, zirconia, boria, phosphorous oxides along with combinations and the like. The composition of the catalyst support may contain from about 0.5 to 50 wt % modified zeolite beta preferably 1 to 30 wt % and more preferably 1 to 15 wt % modified zeolite beta.

The $SiO_2$:$Al_2O_3$ molar ratio of the modified (M) zeolite beta should be at least 50 and more preferably 100.

The modified zeolite beta and amorphous component required in the catalyst and catalyst support of the invention are embodied into particles which contain both components. Perhaps the most convenient method for physically integrating the two components into individual particulates is to comull a wetted mixture of the components and then extrude the comulled material through a die having small openings therein of desired cross-sectional size and shape, e.g. circle, trilobal clover-leaf, quadrolobal clover leafs etc., breaking or cutting the extruded matter into appropriate lengths, drying the extrudatees and then calcining at a temperature, e.g. 480° C., or higher to produce a material suitable for use in high temperature chemical conversion reactions. At present it is preferred that the catalyst be produced in cylindrical form, however, as stated above other cross-sectional shapes are possible such as clover-leafs of polylobal design, for example trilobal or quadrolobal shapes, as shown for example in FIGS. 8 and 10, respectively, in U.S. Pat. No. 4,028,227 herein incorporated by reference in its entirety. Typically, the amorphous oxides besides contributing to the catalytic properties of the catalyst support also serve as a binder for the modified zeolite beta. Alumina and other conventional amorphous, inorganic refractory oxide binder components may be desired.

Regardless of whether an amorphous, inorganic refractory oxide component is used as a binder material to hold the zeolite beta and amorphous oxides together in the catalyst support, it will be understood that other such components can also be incorporated-into the comulled mixture including for example inorganic refractory oxide diluents, which may or may not possess some type of catalyst activity. Examples of such diluents include clays, alumina, silica-alumina and a heterogeneous dispersion of finely divided silica-alumina particles in an alumina matrix, which dispersion is described in detail in U.S. Pat. Nos. 4,097,365; 4,419,271 and 4,857,171, the disclosures of which are herein incorporated by reference in their entireties. Additionally and alternatively, hydrogenation component precursors can also be comulled into the mixture, as will be discussed in more detail hereinafter.

It will be further understood that producing the catalyst and catalyst support of the invention in extrudate form, while certainly the most highly preferred method is still but one option available to those skilled in the art. The catalyst and its support may also be produced in tablet, granules, spheres, and pellets as desired, by any known method for combining zeolites with a porous, inorganic refractory oxide component.

The catalyst of the invention can be used for converting hydrocarbons and other organic compounds into more valuable reaction products by acid catalysed reactions such as alkylation, transalkylation, dealkylation, isomerisation, dehydrocyclisation, dehydrogenation, hydrogenation, cracking, hydrocracking, dewaxing, hydrodewaxing, oligomerisation, aromatisation, alcohol conversion reactions, the conversion of syngas into mixtures of hydrocarbons and the like. When the catalyst or catalyst support contains-modified zeolite beta but no hydrogenation components, it is useful for any of a number of acid-catalysed hydrocarbon conversion reactions in which hydrogen is not an added reactant, e.g. isomerisation, alkylation, transalkylation, cracking, dewaxing, oligomerisation etc. However, since the main benefit of the invention as presently contemplated is in hydroprocessing such as hydrocracking, a process in which hydrogen is an added reactant, the catalyst for this purpose will further require one or more hydrogenation components, in which case the portion of the catalyst exclusive of any hydrogenation metal components is considered the catalyst support upon which the hydrogenation component(s) is dispersed.

Whether the modified zeolite beta particulates, which may optionally include an inorganic refractory oxide binder and/or diluent, are used as the catalyst itself or as the catalyst support (or support component) for hydrogenationmetals, the amounts of the modified zeolite beta and other components present will normally depend on the particular process in which the particles are used.

When the modified zeolite beta particulates are used for selectively producing middle distillates in a hydrocracking process, the catalyst support will typically on a dry basis contain less than 50 wt %, preferably less than 30 wt % and, more preferably less than 15 wt % modified zeolite beta with at least 50 wt %, preferably 100 wt % of the balance being an amorphous, inorganic refractory oxide-binder and diluent in combination.

For use in hydroprocessing, such as hydrocracking, the catalyst contains one or more hydrogenation components containing metals selected from the group consisting of Group VIB and/or Group VIII of the periodic table of elements, such components typically being in the form of the free metals or their respective oxides and sulphides the latter two being most preferred. As used herein "Periodic Table of Elements" refers to the version found in the inside front cover of the "Handbook of Chemistry and Physics", $59^{th}$ Edition, published in 1979 by the Chemical Rubber Company. The platinum group (or noble) metals of the Group VIII metals may be used, but preference is at present for the base (or non-noble) metals, e.g. nickel and cobalt in particular, and nickel most preferably of all. Of the group VIB metals, molybdenum and tungsten are preferred with molybdenum being most preferred when the catalyst is to be used in gasoline hydrocracking and tungsten being most preferred when the catalyst is to be used in middle distillate hydrocracking. The most highly preferred catalyst contains both a non-noble Group VIII metal component and a Group VIB metal component, most preferably nickel and molybdenum or nickel and tungsten in combination.

The hydrocracking catalysts of the invention contain at least 0.2 wt % of the hydrogenation components calculated as the metals. If noble metals are used, the hydrogenation components are generally present in a relatively low proportion, e.g. 0.2 to 2 wt %. For the base or non-noble metals the proportions are generally higher. Non-noble Group VIII metal components are typically employed in proportions between about 2 and 15 wt %, preferably between 3 and 10 wt %, calculated as the respective monoxide. The Group VIB metal component is generally employed in proportions of about 5 to 35 wt %, preferably in the range of 8 to 30 wt %, calculated as the respective trioxide. It is to be understood that the proportions given above for the hydrogenation metal components are based on the finished catalyst whereas the proportions expressed above for the modified zeolite beta particulates are values in the absence of the hydrogenation metal component, i.e. for the catalyst support only. For purposes herein, the term "catalyst support" is defined as all materials in the catalyst except the hydrogenation metal components.

The hydrogenation components may be incorporated into the catalyst in any of many ways known in the art of combining hydrogenation components with catalyst supports containing zeolites. One such method is to first prepare the catalyst support, for example, as an extrudate containing zeolite beta and an amorphous inorganic refractory oxide in calcined form and then impregnating the catalyst support with solutions containing the desired metal(s) in dissolved form. Calcination in air, typically in the absence of added steam at an elevated temperature, e.g. above 425° C., preferably above 475° C., produces the desired catalyst containing metals in oxide form. Likewise, in another embodiment, the desired metal(s) are introduced by comulling a compound containing such metal(s) in the zeolite beta amorphous oxide mixture previously described followed by shaping (e.g. extrusion: through a die), drying and calcining in the substantial absence of steam, e.g. at a temperature between about 425° and 550° C. to produce the oxide form of the catalyst. For one preferred catalyst, the comulling is effected with ammonium heptamolybdate as the source of molybdenum and nickel nitrate as the source of nickel with both compounds generally being introduced into the mulling mixture in the form of an aqueous solution. Other metals can be similarly introduced in dissolved aqueous form likewise, non-metallic elements, e.g. phosphorus.

Catalysts, which contain hydrogenation components in the oxide form as described above, are generally treated to convert the metals to the sulphide form prior to the use of the catalysts in hydrocracking. This can be accomplished by pre-sulphiding the catalyst prior to use at an elevated temperature, e.g. 150 to 375° C. with for example a mixture consisting of 10 volume percent $H_2S$ and 90 volume percent $H_2$. Alternatively, the catalyst can be presulphided ex situ by various sulphiding processes; as an illustration, see "Sulphicat$^R$: Offsite Presulphiding of Hydroprocessing Catalysts from Eurocat" by J. H. Wilson and G. Berrebi, Catalysts 87, Studies in Surface Science and Catalysts #38 page 393. Alternatively, the sulphiding is accomplished in situ, i.e. by using the catalyst in the oxide form to hydrocrack a hydrocarbon feedstock containing sulphur compounds under hydrocracking conditions including elevated temperature and pressure and the presence of hydrogen.

Hydrocracking catalysts in accordance with the invention are useful in the conversion of a wide variety of hydrocarbon feedstocks to a hydrocarbon product of lower average boiling point and/or molecular weight. The feedstocks that may be subjected to hydrocracking by the methods of the invention include all mineral oils and synthetic oils (e.g. shale oil, tar sand products etc.) and fractions thereof. Illustrative feedstocks include straight run gas oils, vacuum gas-oils, coker gas oils and catcracker distillates. The typical hydrocracking feedstock, however, contains a substantial proportion of components usually at least 50 percent by volume, often at least 75% by volume boiling above the desired end point of the products, which end point in the case of gasoline, will generally be in the range of about 190° C. to 215° C. and in the case of middle distillates will typically be in the range of 340° C. to 425° C. Usually, the feedstock will also contain gas oil components boiling above 285° C. with highly useful results being achievable with feeds containing at least 30 percent by volume of components boiling between 315° C. and 600° C.

For best results in hydrocracking, the catalyst of the invention will be employed as a fixed bed of catalytic particulates in a hydrocracking-reactor vessel into which hydrogen and the feedstock are introduced and passed in a downwardly direction. Operating conditions in the reactor vessel are chosen so as to convert the feedstock into the desired product, which in one preferred embodiment is a hydrocarbon product containing a substantial proportion of gasoline components boiling, for example in the 85° C. to 215° C. range. However, other products-such as middle distillates boiling in the 150° C. to 425° C. range may also be highly desired, and conditions must be adjusted according to the product (or distribution of products) desired. The unconverted oil, e.g. hydrocarbons boiling at a temperature higher than that of the middle distillate fraction may be used for production of lube oil blending stocks, fluid cracker feedstocks or ethylene cracker feedstock. The exact conditions required in a given situation will depend upon the nature of the feedstock, the particular catalyst composition utilised, and the desired product(s). In general, the conditions of operation for hydrocracking will fall into the following usual and preferred ranges.

TABLE 1

| Conditions | Usual | Preferred |
| --- | --- | --- |
| Temperature, ° C. | 230-455 | 260-430 |
| Pressure, Mpa | 4-30 | 5-20 |
| LHSV, $h^{-1}$ | 0.3-5.0 | 0.5-3.5 |
| $H_2$/feedstock, $Nm^3/m^3$ | 200-2000 | 500-1500 |

The foregoing Table 1 shows the suitable and preferred hydrocracking conditions for single stage or for each stage of a two stage operation. It will be understood, however, that the operating conditions in the two stages of the two stage process are not necessarily identical. In fact, as mentioned before, the primary difference in conditions in the two hydrocracking reactor vessels of two stage operation is the presence of substantial amounts of ammonia often greater than about 2000 vol ppm in the first stage, and its essential absence, i.e. less than 200 vol ppm and preferably less than about 20 vol ppm in the second, allowing for less severe conditions in the second stage. There may, however, be yet other differences in conditions in any particular situation.

Based on the presently available data, the catalysts of the invention, when compared with Y zeolite catalysts of similar $NH_3$-AI and IEC-AI, are found to be substantially more selective for middle distillate production. These achievements and others are proven in the following examples, which are provided for illustration purposes and not to limit the invention as defined by the claims.

EXAMPLES

The key parameter in defining the zeolites are measured by the following techniques:
Ammonia Temperature Programmed Desorption ($NH_3$ TPD)
  A 0.1 g sample of zeolite is heated in helium at 500° C. for 2 hours. The pretreated zeolite is then cooled to 150° C. The sample is then saturated at this temperature by a mixture of 2 vol % ammonia in helium for ½ hour. The saturated zeolite is then purged with helium for 2 to 3 hours. Immediately after this period, the exit gas is directed to a bubble flask containing 100 ml of a 0.65 N boric acid solution and 100 ml water in order to collect the desorbed ammonia, while the temperature is raised to 850° C. with a temperature ramp of 10° C./min. The boric acid solution is then titrated with a 0.01 N HCl solution until the pH equals 4.90. At this point the amounts of HCl added equals the amount of $NH_3$ desorbed from the zeolite sample, and the acidity is reported as mmole $NH_3$ desorbed per gram of sample after the determination.
Ion Exchange Capacity (IEC)
  10 grams of zeolite are contacted three times at 25° C. for a period of one hour each time with a fresh aqueous ion ex, change solution containing 10 g of NaCl per liter of solution (100 ml of solution is used for each gram of zeolite). After this contact, the zeolite is contacted for one hour with 100 ml hot pure water for each gram of zeolite (60-70° C.) in order to remove excess of sodium. The sodium content after calcination at 600° C. is then determined and reported as the ion exchange capacity.
$NH_3$ TPD Acidity Index ($NH_3$-AI)
  The $NH_3$-AI is defined as the amount of mole $NH_3$/g zeolite (measured by the $NH_3$ TPD method) of the zeolite used in the catalyst support multiplied by the weight percentage of the zeolite in the catalyst support normalised by a catalyst support containing 1 wt % of a standard zeolite beta (CP 814E from Zeolyst International) having a specified. $SiO_2$:$Al_2O_3$ molar ratio of 25 and a $NH_3$-TPD of 0.90 mmole $NH_3$/g zeolite (all on dry weight basis).

$$NH_3 - AI = \frac{(\text{mole } NH_3/g \text{ zeolite}) \times}{(\text{mole } NH_3/g \text{ standard zeolite beta}) \times (1 \text{ wt \%})}$$

Ion-Exchange Capacity Acidity Index (IEC-AI)

The IEC-AI is defined as the amount of wtppm of sodium in the zeolite (measured by the IEC method) used in a catalyst support multiplied by the weight percentage of zeolite in the catalyst support normalised by a catalyst support containing 1% of a standard zeolite beta (CP 814E from Zeolyst International) having a specified $SiO_2:Al_2O_3$ molar ratio of 25 and an IEC of 18,500 wtppm sodium (all on dry weight basis).

$$IEC - AI = \frac{(\text{wt ppm sodium}) \times}{(\text{wt ppm sodium in standard zeolite beta}) \times (1 \text{ wt \%})}$$

Example 1

A catalyst was prepared by mixing 10 wt % of a commercially available zeolite beta having a specified $SiO_2:Al_2O_3$ molar ratio of about 1500, a $NH_3$ TPD of 0.077 mmole $NH_3$/g zeolite and an ion exchanged capacity (IEC) of 630 wtppm sodium with 35 wt % amorphous silica-alumina (high alumina type) and 55 wt % gamma alumina. The resulting mixture was extruded to form 1/16" extrudates. The extrudates were dried and calcined at 550° C. for 2 hours in air. The calcined extrudates were impregnated with an aqueous solution containing nickel nitrate and ammonium metatungstate. The wet extrudates were dried and calcined at 550° C. for 2 hours in air. The final catalyst contained 6 wt % nickel oxide (NiO) and 22 wt % tungsten oxide ($WO_3$) (all on dry weight basis).

Examples 2-4

The three catalysts of Examples 2-4 were prepared in the same way as in Example 1 except that other beta zeolites were used. In Example 2, a commercially available zeolite beta having a specified $SiO_2:Al_2O_3$ molar ratio of about 500, a $NH_3$ TPD of 0.092 mmole $NH_3$/g zeolite and an IEC of 2000 wtppm sodium was used. In Example 3, a commercially available zeolite beta with a specified $SiO_2:Al_2O_3$ molar ratio of about 300, a $NH_3$ TPD of 0.151 mmole $NH_3$/g zeolite and an IEC of 2870 wtppm sodium was used. In Example 4, a commercially available zeolite beta with a specified $SiO_2:Al_2O_3$ molar ratio of about 100, a $NH_3$ TPD of 0.236 mmole $NH_3$/g zeolite and an IEC of 5630 wtppm sodium was used.

Example 5

A sample of a commercially available zeolite Y type was steamed in 100% steam for two hours at 750° C. resulting in an $NH_3$ TPD of 0.089 mmole $NH_3$/g zeolite and an IEC of 1630 wtppm sodium. A portion of this modified zeolite Y was mixed with 74 wt % amorphous silica-alumina (high alumina type), and 20 wt % gamma alumina to obtain a mixture containing 6 wt % of the modified zeolite Y. The mixture was extruded, calcined and impregnated as in Example 1.

Example 6

A catalyst was prepared in the same way as described in Example 5 except that a commercially available zeolite Y type with a specified $SiO_2:Al_2O_3$ molar ratio of about 15, a $NH_3$ TPD of 0.118 mmole $NH_3$/g zeolite and an IEC of 2105 wtppm sodium was used.

Examples 7-8

Two catalysts were prepared in the same way as described in Example 1 expect that the beta zeolite component was re, placed by zeolite Y. In Example 7, a commercially available zeolite Y type with a specified $SiO_2:Al_2O_3$ molar ratio of about 55, a $NH_3$ TPD of 0.229 mmole $NH_3$/g zeolite and an IEC of 5990 wtppm sodium was used. In Example 8, a commercially available zeolite Y type with a specified $SiO_2:Al_2O_3$ molar ratio of about 30, and an $NH_3$ TPD of 0.428 mmole $NH_3$/g zeolite and an IEC of 9570 wtppm sodium was used.

The properties of the catalyst support with the calculated $NH_3$-AI and IEC-AI of Examples 1-8 are given in Table 2. The zeolite used in the examples have been obtained from Tosoh Corporation Zeolyst International.

Example 9

The catalysts prepared in Examples 1-8 were tested according to the following conditions. Prior to testing, the catalyst was sulphided in the presence of hydrogen and hydrogen sulphide at a temperature from 150° C. to 360° C. Feed A (properties are given in Table 3) was passed on a once-through basis through an isothermal reactor containing catalyst particles uniformly mixed with carborundum. The catalyst was tested under the following operating conditions: LHSV of 0.5-1.0 $h^{-1}$, total pressure 14.2 MPa, and a hydrogen gas/feed ratio of 1500-1800 Nl/l. The temperature of the reactor was adjusted to provide 75 wt % conversion of the >360° C. fraction in the feedstock. The temperature required to obtain the desired conversion level was from 380-400° C. The selectivity to middle distillate products was measured as the percentage fraction of the 360° C. minus product fraction boiling in the range from 160-360° C. The conversion and selectivity were calculated from gas chromatograph boiling range analyses of the product according to ASTM D 2887.

Figure 2:
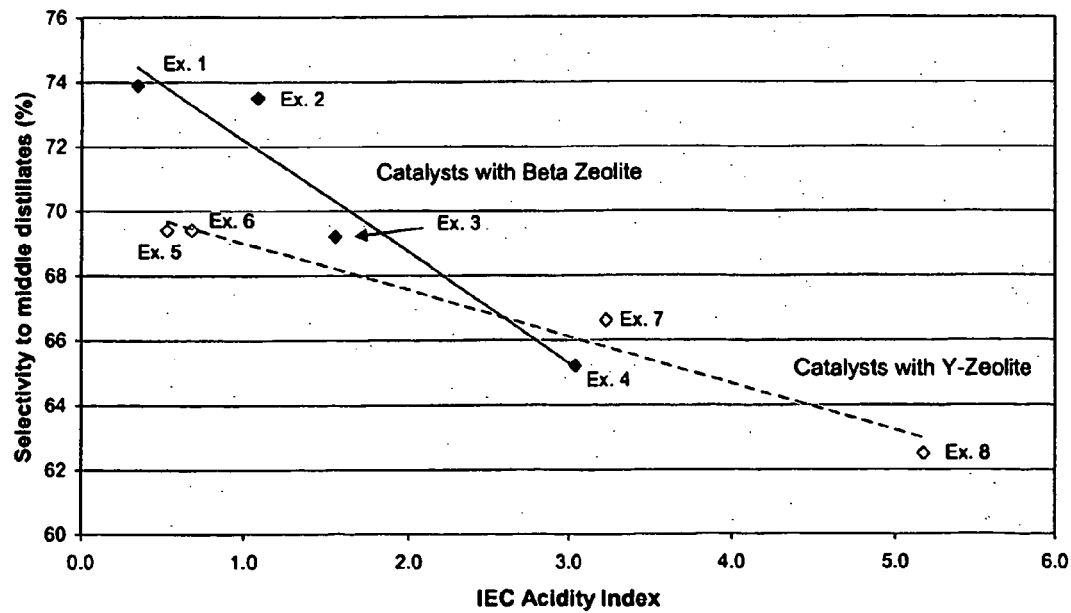

The results of the testing of all catalysts are given in Table 4. The data in Table 2 and Table 4 and FIGS. 1-2 show a comparison of catalysts containing modified zeolite beta versus catalysts containing zeolite Y. The catalysts of the invention are very superior in terms of selectivity to middle distillates. The data also reveal that the catalysts had excellent denitrogenation and desulphurisation activities. The pour point of the >360° C. product cut as compared with the pour point of the same fraction in the feedstock was reduced significantly during the processing.

Example 10

A catalyst was prepared in the same way as in Example 1 containing 10 wt % of a commercially available zeolite Y type having a specified $SiO_2:Al_2O_3$ molar ratio of about 15, an $NH_3$ TPD of 0.118 mmole $NH_3$/g zeolite and an IEC of 2105 wtppm sodium resulting in an $NH_3$-AI of 1.311 and a IEC-AI of 1.249.

Example 11

A commercially available zeolite beta with a specified $SiO_2:Al_2O_3$ molar ratio of about 300, an $NH_3$ TPD of 0.151 mmole $NH_3$/g zeolite and an IEC of 2870 wtppm sodium resulting in an $NH_3$-AI of 1.174 and an IEC-AI of 1.086 was mixed with 38 wt % amorphous silica-alumina (high alumina type) and 55 wt % gamma alumina to obtain 7 wt % zeolite in the catalyst support. The mixture was extruded to form 1/16" extrudates. The extrudates were calcined and impregnated as in Example 1. The zeolite used in the examples have been obtained from Tosoh Corporation and from Zeolyst International.

Example 12

The catalysts prepared in Examples 10 and 11 were tested according to the procedure given in Example 9 except that Feed B with the properties given in Table 3 was used. The zeolite used in the examples have been obtained from Tosoh Corporation and from Zeolyst International.

The test of the catalyst containing zeolite Y prepared in Example 10 with an $NH_3$-AI of 1.311 and an IEC-AI of 1.249 results in a selectivity to middle distillate of 69.1%. The catalyst prepared in Example 11 containing zeolite beta with an $NH_3$-AI of 1.174 and an IEC-AI of 1.086 results in a selectivity to middle distillate of 71.9%.

Example 12 illustrates that the catalyst containing zeolite beta in accordance with the present invention is clearly more selective to middle distillate on a second feed than the catalyst based on zeolite Y with similar $NH_3$-AI and IEC-AI.

TABLE 2

ZEOLITE AND CATALYST PROPERTIES

| Example | Zeolite Type | $NH_3$-AI wt % | IEC-AI wt % |
|---|---|---|---|
| 1 | Beta | 0.856 | 0.341 |
| 2 | Beta | 1.022 | 1.081 |
| 3 | Beta | 1.678 | 1.551 |
| 4 | Beta | 2.622 | 3.043 |
| 5 | Y | 0.593 | 0.529 |
| 6 | Y | 0.787 | 0.683 |
| 7 | Y | 2.544 | 3.243 |
| 8 | Y | 4.759 | 5.173 |

TABLE 3

FEED PROPERTIES

| | FEED A | FEED B |
|---|---|---|
| Specific gravity | 0.8785 | 0.8816 |
| Sulphur, D-4294, wt % | 0.84 | 0.55 |
| Nitrogen, D-4629, wtppm | 641 | 601 |
| Hydrogen, D-4804, wt % | 12.95 | 13.05 |
| Aromatics, IP-391, wt % | | |
| Mono | 12.9 | 15.4 |
| Di | 5.1 | 4.6 |
| Tri+ | 6.6 | 6.1 |
| Pour Point, D-5949, ° C. | 30 | 30 |
| Viscosity @40° C., cSt | 13.79 | |
| Viscosity @50° C., cSt | | 11.5 |
| Viscosity @100° C., cSt | 3.229 | 3.506 |
| Distillation, ° C., D-2887 | | |
| IBP/5 | 168/264 | 209/274 |
| 10/20 | 296/326 | 308/344 |
| 30/40 | 354/371 | 366/383 |
| 50/60 | 387/402 | 399/413 |
| 70/80 | 416/432 | 425/437 |
| 90/95 | 456/477 | 451/462 |
| FBP | 514 | 489 |
| >360° C., wt % | 66.7 | 72.6 |
| >360° C. cut | | |
| Pour Point, D-5949, ° C. | | 36 |
| Specific gravity | | 0.8869 |

TABLE 4

TEST RESULTS

| Example | Feed | Selectivity to middle distillates 160-360° C. | >360° C. Pour Point | Product Nitrogen | Product Sulphur |
|---|---|---|---|---|---|
| 1 | A | 73.9% | 0° C. | <1 wtppm | 1 wtppm |
| 2 | A | 73.5% | −1° C. | <1 wtppm | 2 wtppm |
| 3 | A | 69.2% | 7° C. | <1 wtppm | 4 wtppm |
| 4 | A | 65.2% | 7° C. | <1 wtppm | 3 wtppm |
| 5 | A | 69.4% | | | |
| 6 | A | 69.4% | | | |
| 7 | A | 66.6% | | | |
| 8 | A | 62.5% | | | |

Although it should be more than clear from the previous how the invention can be utilised in the industry, it can be summarised as follows: The invention will find its use in the petroleum refining industry, and more specifically in those processes employed in the petroleum refining industry that require catalysts. Catalysts prepared in accordance with the invention are most usefully employed without hydrogenation components in such processes as catalytic cracking, catalytic isomerisation, catalytic alkylation and catalytic transalkylation. The catalysts of the invention are most usefully employed with one or more hydrogenation components when catalytic hydrocracking, catalytic hydrodenitrogenation or catalytic hydrodesulphurisation is required. The best contemplated use of the catalyst of the invention is for hydrocracking of gas oils and the like to produce midbarrel products boiling in the 150° C. to 420° C. range, and for such hydrocracking the most preferred catalyst comprises sulphided nickel and tungsten components on a catalyst support consisting essentially of a modified beta zeolite silica-alumina, alumina and binder.

While particular embodiments of the invention have been described, it goes without saying that the invention is not limited thereto since many obvious modifications can be made, and it is intended to include within this definition any such modifications as will fall within the scope of the appended claims.

The invention claimed is:

1. Process for selective preparation of middle distillates by selective conversion of a hydrocarbon containing feedstock under hydrocracking conditions with a hydrocarbon conversion catalyst comprising one or more hydrogenation components supported on a support comprising a beta zeolite and an amorphous inorganic oxide, the beta zeolite having undergone the process step of being modified to an Ion Exchange Capacity of 630 to 5630 wtppm sodium and having a $SiO_2$:$Al_2O_3$ molar ratio of at least 50 and a surface area as measured by BET of 400-800 m$^2$/g, the amorphous inorganic oxide selected from the group consisting of silica-alumina, alumina and combinations thereof, the support having an Ion Exchange Capacity-Acidity Index of less than 3.7, the support comprising less than 30 wt % zeolite beta, and the hydrogenation component consisting of Group VIII and/or Group VI B elements.

2. Process of claim 1 wherein the support has an $NH_3$-TPD Acidity Index of less than 3.5.

3. Process of claim 1, in which the $NH_3$-TPD Acidity Index is less than 2.3 and/or the Ion Exchange Capacity-Acidity Index is less than 2.7.

4. Process of claim 1, wherein the beta zeolite has a $SiO_2$:$Al_2O_3$ molar ratio of at least 100.

5. Process of claim 1, wherein the hydrogenation components are selected from the group consisting of tungsten, molybdenum, nickel and combinations thereof.

6. Process of claim 5, wherein the hydrogenation components are a combination of nickel and tungsten.

7. Process of claim 1, wherein the support comprises at least 50 wt % amorphous inorganic oxide.

8. Process of claim 2, in which the $NH_3$-TPD Acidity Index is less than 2.3 and/or the Ion Exchange Capacity-Acidity Index is less than 2.7.

9. Process of claim 1, wherein only a single type of catalyst is used in a single hydrocracking step to selectively produce a single middle distillate product.

10. A hydrocarbon conversion process comprising contacting a hydrocarbon feedstock in the presence of hydrogen under hydrocarbon conversion conditions with a catalyst as defined in claim 1.

* * * * *